March 9, 1943.　　　O. DALE　　　2,313,465
MEANS FOR PRODUCING CABLE MARKERS
Filed Dec. 10, 1940　　　3 Sheets-Sheet 1
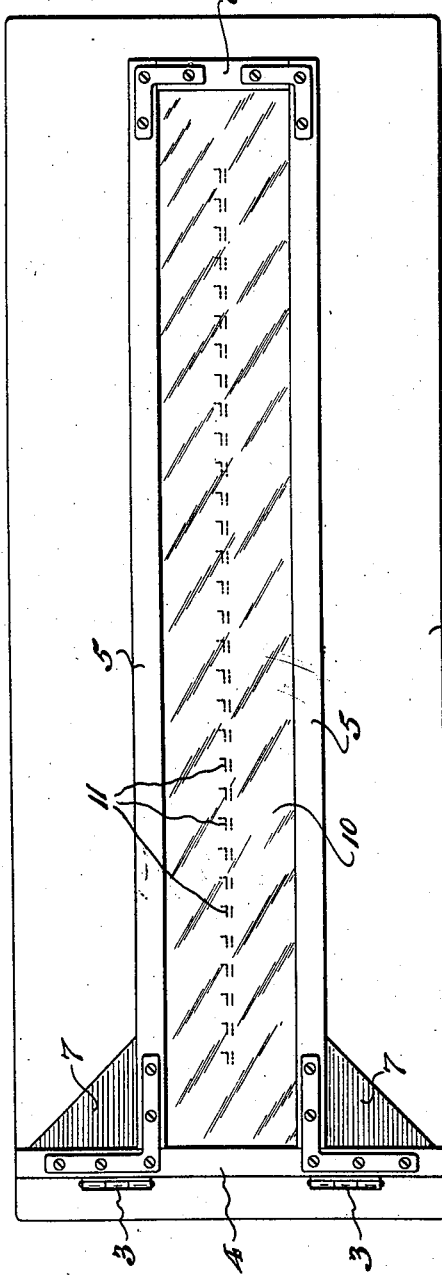
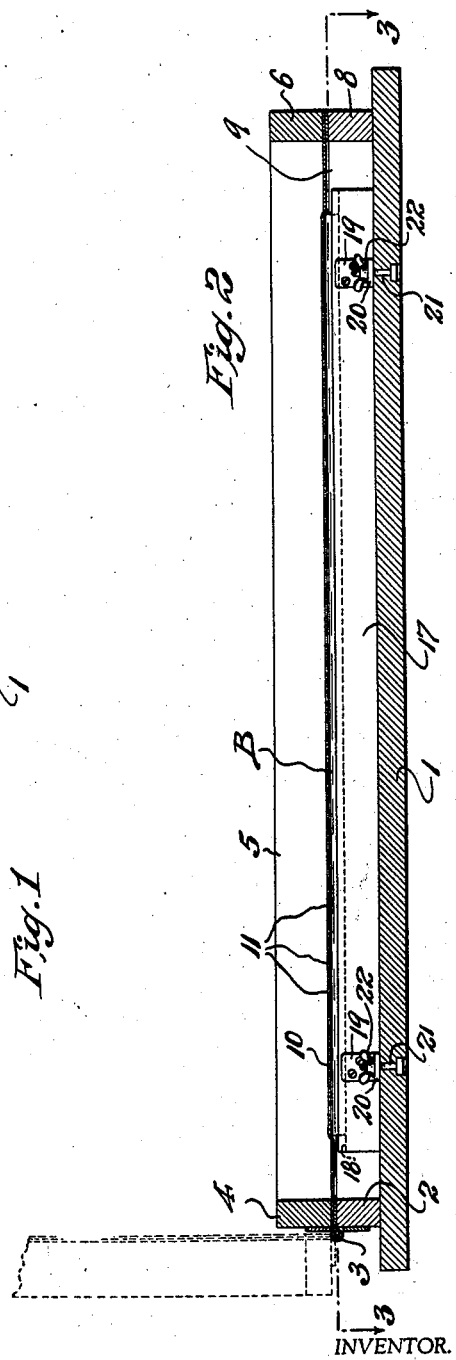
INVENTOR.
Oswald Dale,
BY George D. Richards
ATTORNEY.

March 9, 1943. O. DALE 2,313,465
MEANS FOR PRODUCING CABLE MARKERS
Filed Dec. 10, 1940 3 Sheets-Sheet 2
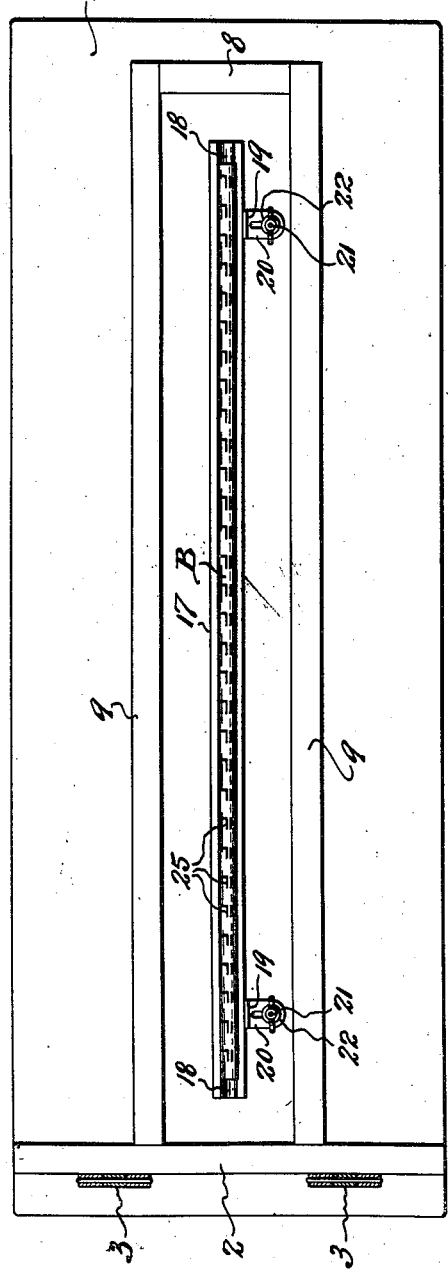
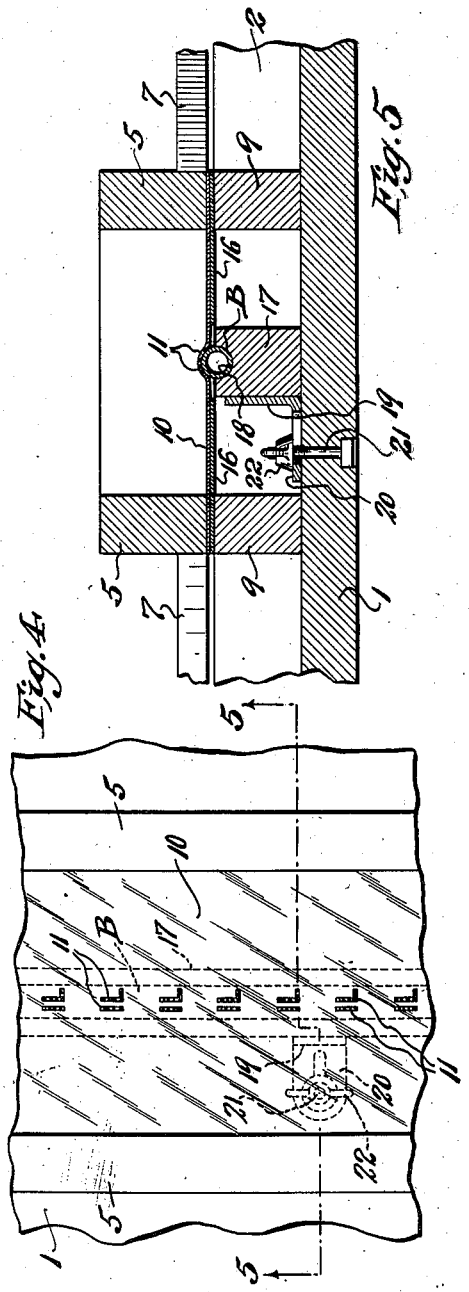
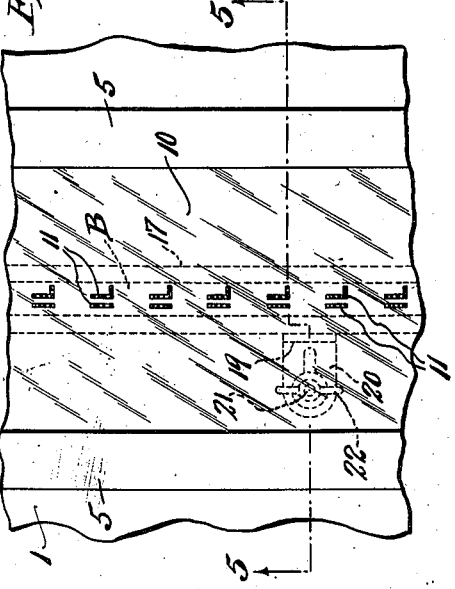
INVENTOR.
Oswald Dale,
BY George D. Richards
ATTORNEY.

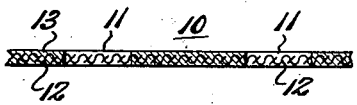
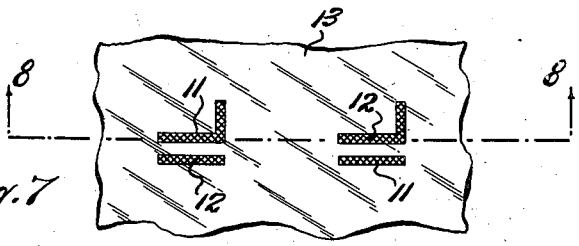
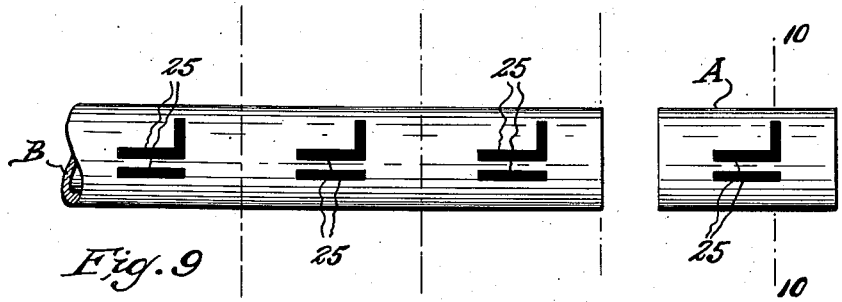
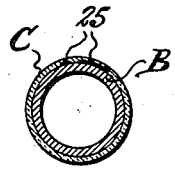
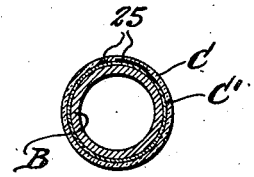
INVENTOR.
Oswald Dale,
BY George D. Richards
ATTORNEY.

Patented Mar. 9, 1943

2,313,465

UNITED STATES PATENT OFFICE 2,313,465

MEANS FOR PRODUCING CABLE MARKERS

Oswald Dale, Nutley, N. J., assignor to Irvington Varnish & Insulator Co., Irvington, N. J., a corporation of New Jersey Application December 10, 1940, Serial No. 369,392

1 Claim. (Cl. 101—126)

This invention relates to improvements in method and means for producing markers for electric conducting leads or cables so that the same may be quickly identified and distinguished one from another; and the invention also has reference to novel apparatus for printing identifying marks upon the material from which the markers are made.

Heretofore it has been the practice to apply identifying numbers or symbols to a metal clip and then wrap or clinch the clip around the lead or cable desired to be identified thereby. This practice was objectionable for the reason that it frequently resulted in setting up abnormal electrical stresses within the cable insulation, which often caused failure of the insulation. To avoid this objection it has also heretofore been proposed to make marker bodies from tubular braided cotton sleeving, or other tubular non-metallic sleeving, upon which desired identifying marks were applied, either by printing or stamping the marks onto the same. Heretofore used methods of directly printing or stamping the marks upon the sleeving have been found laborious and slow, and therefore high in labor cost.

Having the above stated facts in mind, it is an object of this invention to provide a novel method of direct imprinting of the marker sleeving by a stenciling process which is quick, easy and accurate, and which produces clear and legible imprints of desired marks free fom blurs, and then coating the printed sleeving with a transparent varnish whereby the marks are protected against obliteration by abrasion or other causes.

This invention also has for an object to provide a novel stenciling apparatus, including a support for a predetermined length of sleeving to be printed, and a novel stencil, and movable carrier frame therefor, adapted to be superposed upon the supported sleeving subject to transmission of applied marking ink therethrough and onto the supported sleeving, whereby a considerable length of sleeving can be treated in one operation to produce a considerable number of spaced identifying marks imprinted thereon, whereupon the imprinted length of sleeving can be varnished and then cut up to provide the ultimate marker bodies, each of the latter bearing a given identification mark.

This invention has for a further object to provide in the novel stenciling apparatus above mentioned, means to laterally adjust the sleeving support, whereby marks including more than two digits or symbols can be produced by laterally shifting the supported position of the sleeving into alignment with those portions of the stencil which contain the additional digit or symbol perforations.

Other objects of this invention, not at this time more particularly enumerated, will be understood from the following detailed description of the same.

The invention is illustrated in the accompanying drawings, in which:

Fig. 1 is a top plan view of the novel stenciling apparatus for printing lengths of sleeving from which the marker bodies are produced; Fig. 2 is a longitudinal vertical section through the stenciling apparatus; Fig. 3 is a horizontal sectional view thereof, taken on line 3—3 in Fig. 2; Fig. 4 is a fragmentary top plan view of the stenciling apparatus, drawn on an enlarged scale; and Fig. 5 is a transverse vertical section, taken on line 5—5 in Fig. 4.

Fig. 6 is a fragmentary sectional view showing the method of producing the stencil member of the stenciling apparatus; Fig. 7 is a fragmentary plan view of the resultant stencil member; and Fig. 8 is a longitudinal sectional view, taken on line 8—8 in Fig. 7.

Fig. 9 is an enlarged elevational view of a portion of the length of marker sleeving made according to this invention, and which is adapted to be severed along the broken lines indicated in this figure to produce a plurality of cable markers, one such marker being shown so cut away from said sleeving; Fig. 10 is a transverse section through a marker, taken on line 10—10 in Fig. 9; and Fig. 11 is a similar transverse sectional view of a somewhat modified construction of the marker body.

Similar characters of reference are employed in the above described views, to indicate corresponding parts.

Referring to the drawings, the novel stenciling apparatus comprises a base 1 upon and adjacent to one end of which is affixed an upstanding transverse anchor member or block 2 of suitable height. Hingedly connected with said anchor member or block 2, by hinge elements 3, is a rectangular stencil frame of suitable length and width. Said stencil frame comprises a transverse butt member 4 which registers over said anchor member or block 2, and to which the hinge elements 3 are secured. Extending from said butt member 4 are the laterally spaced apart side members 5 of the frame, the outer free ends of which are connected together by a transverse end member 6. To assure desired rigidity of the stencil frame thus constituted, bracing web pieces 7 are suitably secured to and between and within the angles formed between the end portions of the butt member 4 and the exterior sides of the frame side members 5. To support the stencil frame in its operative position, a transverse stop member or block 8 of proper height is affixed to said base 1 to upstand therefrom in position to supportingly sustain the free end of the stencil frame. If desired longitudinally disposed upstanding supporting members 9 may also be affixed to the base, for extension between said anchor member or block 2 and said stop member or block 8, to underlie and support the stencil frame side members 5 when said frame is swung down to operative position. While these supporting members 9 are not essential, provision of the same is preferred, since the added support provided thereby assures rigid and non-vibrating support of said frame when it is operatively disposed for use.

Affixed to the underside of the stencil frame, to extend over the opening thereof, is a stencil member 10 provided with a longitudinal row of suitably spaced apart stencil apertures 11 shaped to correspond to desired numbers or other symbols constituting the identifying marks to be applied to marker body material. The stencil member 10 comprises a sheet of woven textile fabric, such e. g. as silk bolting cloth 12. In the preparation of the stencil member, said sheet of bolting cloth is coated or impregnated with photogenic gelatin 13. Over this is applied a transparent positive 14 bearing light impervious numbers or symbols 15 desired to be formed in the stencil member, and by submission to light applied through the thus contacting positive 14 (in the direction of the arrows shown in Fig. 6 of the drawings), contact prints of the numbers or symbols 15 are made on the photogenic gelatin coating of the cloth 12. Where the light strikes said coating, the same is rendered insoluble by the chemical action of the light thereupon, but where shielded from the light by the light impervious numbers or symbols 15 of the positive 14, said coating will remain soluble, whereupon by suitably washing the cloth after such printing, the soluble portions of the gelatin coating are carried away, thus exposing the pervious cloth to form ink penetrable stencil apertures 11 corresponding in shape to the numbers or symbols 15.

The stencil member thus prepared, when affixed to the stencil frame, by suitable means, is stretched and spread over the frame opening so as to dispose the stencil aperture 11 in a centrally positioned longitudinal row extending substantially from end to end of the frame. Preferably either one or both sides of the cloth, with exception of a relatively narrow band or strip thereof in which said stencil apertures 11 are located, is masked by adhered layers 16 of paper or other suitable masking material thereto, which serves to protect the same against injury, as well as to prevent undue stretch or distortion thereof.

Mounted on the base 1, so as to underlie the stencil member 10 when the stencil frame is swung down to operative position, is a longitudinal saddle member 17 for supporting the tubular material from which the marker bodies are to be produced. This saddle member 17 is provided along its top with a seating channel or groove 18 of suitable cross-sectional shape, in which is seated a length of the tubular marker body material B desired to be printed with marker body identifying numbers, symbols or the like. Said saddle member 17 is preferably mounted on the base subject to lateral shifting adjustment, for purposes subsequently referred to. Illustrative of one means for so arranging said saddle member, the same is provided with a plurality of anchoring brackets 19 affixed in suitable locations to at least one side thereof. Said brackets have slotted foot pieces 20 slidably supported on the base 1. Suitably anchored in the base 1, in positions corresponding to the positions of said brackets, are upstanding screw-threaded studs 21 adapted to extend through the slots of the bracket foot-pieces 20. Threaded onto said studs 21 are thumb-nuts 22, which, when screwed home, clamp the bracket foot pieces 20 in selected positions for fixing the saddle member 17 in a desired laterally adjusted position adapted to align the length of tubular material supported thereby with the row of stencil apertures 11, or a selected part thereof, when the stencil frame is swung down thereover in operative relation thereto.

In the use of the stenciling apparatus, the stencil frame is upswung to out of service position (indicated by dotted lines in Fig. 2), thus giving access to the saddle member 17 for deposit of a length of tubular marker body material B to be printed in the seating channel or groove 18 thereof. Said saddle member 17 having been laterally adjusted to assure proper disposition of the supported material B in alignment with the row of stencil apertures 11 with which the stencil member 10 carried by the stencil frame is provided, said stencil frame is swung down to operative position (shown by full lines in said Fig. 2), whereby the stencil member 10 is pressed down upon and in covering relation to the upwardly presented surface of the material B so as to dispose its row of stencil apertures 11 in operative relation to said surface of the material B. A suitable marking ink having been applied to the upper exposed surface of the stencil member 10, the operator, by means of suitable squeegee or like instrument, moves the ink over and forces the same through the stencil apertures 11 so as to imprint the same onto the underlying surface of the material B.

It will be obvious that a very considerable length of material B can be quickly printed with a plurality of spaced identifying marks, from which length of material the marked sections may be easily cut away to form a plurality of individual marker bodies A. Printed marker bodies of the kind to which this invention relates, among other uses, find an extensive use as means to identify ignition cables for connection with the cylinders of automotive and aeroplane internal combustion engines. When used for this purpose the various identifying marks may be either single digit or two digit members corresponding to the numbers of the engine cylinders, or the same may include additional symbols, such as the letters L and R, respectively indicating left hand and right hand cylinders of certain types of such internal combustion engines. In the stenciling operations above described it is a simple matter to print one or two digit members, or one digit member with associated symbol, in a single operation. When, however, the mark comprises a two digit member plus an associated symbol, or equivalent mark involving more than two digits or other symbols, it is found more satisfactory, especially on tubular material of comparatively small diameter, to perform the printing in two or more operations. For example, the saddle member 17 is first adjusted to register a desired portion of the tubular material B so as to receive imprint of one or two digits, or digit and symbol combinations, after the printing of which the saddle member 17 is laterally shifted and adjusted to align the tubular material with the row of stencil apertures provided in such cases for printing additional digits or symbols, whereupon the tubular material B is rotatively adjusted on the saddle to register a properly located unprinted portion thereof in aligned relation to and so as to receive imprints from said additional digit or symbol stencil apertures in a second operation. The advantage of mounting the saddle member 17 subject to lateral adjustment, as already above described, will therefore be obvious considering the desirability of the above described method of two or more step operations where marks including more than two digits and/or symbols are desired to be imprinted on the marker material.

After the tubular material B has been imprinted with selected identifying markings 25, the exterior surface thereof is preferably coated with a coating C of transparent varnish, lacquer or the like, whereby a protective transparent covering film shields the imprints from obliterating abrasion, see Fig. 10. In some cases it is desirable to cover the surface of the tubular material B with an undercoat C' of varnish lacquer or the like preliminary to printing the desired markings thereon. Such undercoat C' is especially useful when the tubular material B comprises braided or woven cotton or other textile sleeving, since the same acts as a filler and serves to provide a smooth surface to which the marking imprints are applied. After printing, the final outer and protective coating C of transparent varnish, lacquer or the like is applied to shield the imprints against obliterating abrasion, all as shown in Fig. 11.

After the imprinted and varnished or lacquered material B is completed, the desired marker bodies A are obtained by transversely severing the material B intermediate the imprinted markings, as indicated in Fig. 9.

I am aware that changes could be made in the above described construction of stenciling apparatus, as well as in the methods involved in preparing the material and obtaining the ultimate marker bodies, without departing from the scope of this invention as defined in the herefollowing claim. It is therefore intended that all matter contained in the above description or shown in the accompanying drawings shall be interpreted as illustrative and not in a limiting sense.

I claim:

Apparatus for imprinting the surface of a length of tubular marker body material with a longitudinal row of spaced marks, from which imprinted annular identification marker bodies are to be severed, comprising, a base, a saddle member, said saddle member having a longitudinal seating channel in its top to receive and support said tubular material, an open rectangular stencil frame, a stencil sheet affixed to the underside of said frame in flat extension across the opening thereof, means to hingedly connect one end of said stencil frame to said base subject to down-swinging movement adapted to superpose the stencil sheet upon the supported tubular material, means on said base to limit down-swinging movement of said stencil frame, whereby to snugly and conformably engage the stencil sheet with portions of the exposed surface of the tubular material without undue pressure, and means to movably connect said saddle member to said base subject to lateral shifting adjustment for aligning the supported tubular material with and for engagement by selected portions of the stencil sheet.

OSWALD DALE.